United States Patent [19]

Bays

[11] 4,234,222
[45] Nov. 18, 1980

[54] PROTECTIVE DEVICE FOR AUTOMOBILES

[76] Inventor: Marvin J. Bays, Rte. 1, Box 41AA, Stillwater, Okla. 74047

[21] Appl. No.: 43,367

[22] Filed: May 29, 1979

Related U.S. Application Data

[63] Continuation-in-part of Ser. No. 901,529, May 1, 1978, abandoned.

[51] Int. Cl.³ .............................................. B60R 19/00
[52] U.S. Cl. .................................... 293/124; 293/128; 293/119
[58] Field of Search .............. 293/128, 126, 124, 114, 293/118, 119, 1; 280/770

[56] References Cited

U.S. PATENT DOCUMENTS

| | | | |
|---|---|---|---|
| 1,465,590 | 8/1923 | Rodgers | 293/124 |
| 3,782,766 | 1/1974 | Teel | 293/124 |
| 4,025,098 | 5/1977 | Powaska | 293/128 |

Primary Examiner—Robert R. Song
Attorney, Agent, or Firm—Larry B. Dwight

[57] ABSTRACT

A vehicle body protection device having a first pair of arms telescopically disposed within a sleeve and adapted to extend outwardly from the side of a vehicle on the rear portion of the vehicle and a second set of arms telescopically disposed within a sleeve positioned on the forward portion of the vehicle. A flexible band stored in a storage case and retracted therein by a spring is positioned over a roller on each of the first pair of arms and is adapted to be pulled to the second pair of arms and secured in a predetermined length between the arms such that a door from an adjacent vehicle will be slowed and deflected prior to engaging finish of the vehicle. A second embodiment would energize an alarm while deflecting the door if so desired.

5 Claims, 10 Drawing Figures

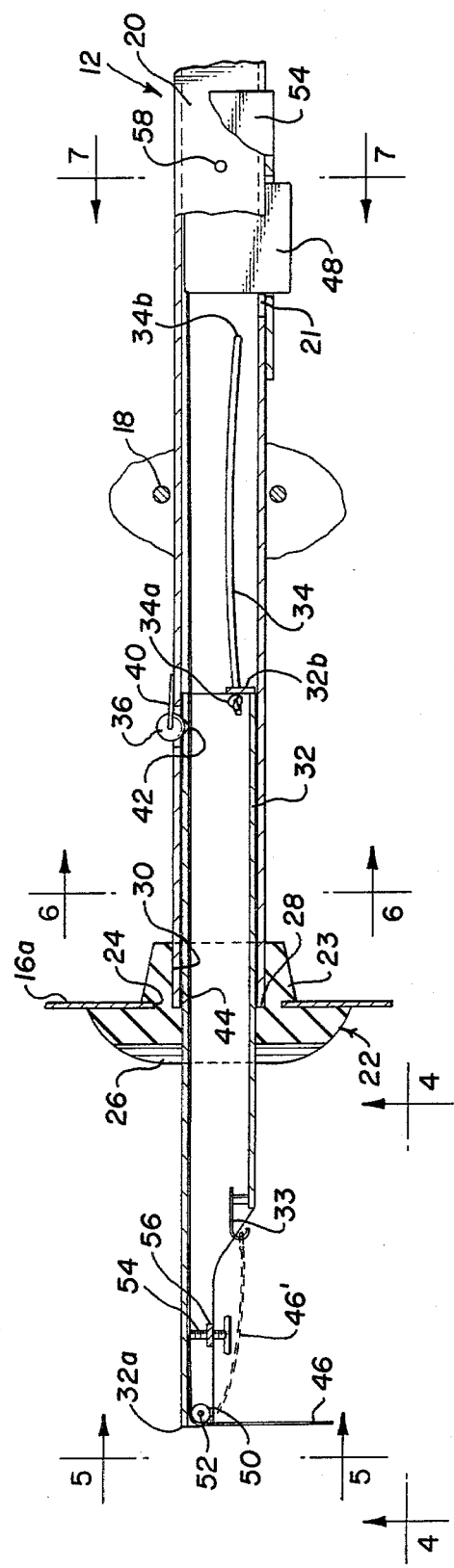
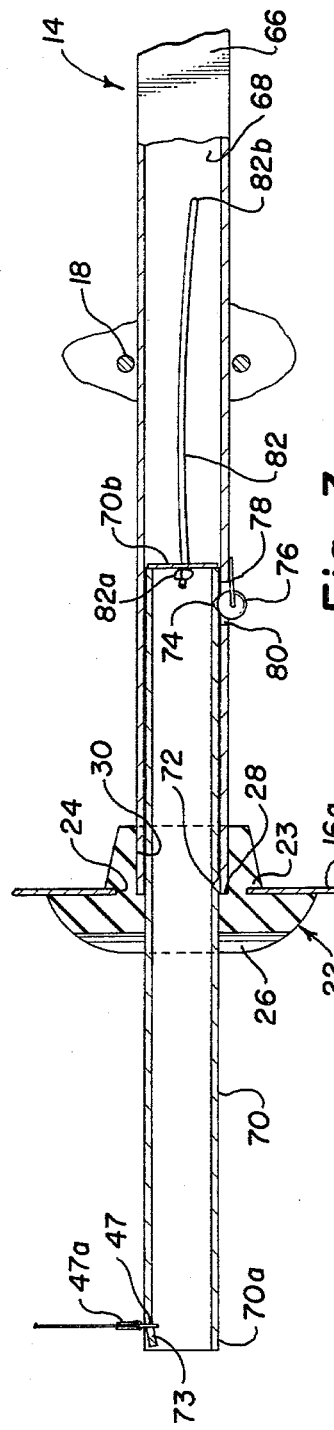
Fig. 2
Fig. 3

PROTECTIVE DEVICE FOR AUTOMOBILES

CROSS REFERENCE TO RELATED APPLICATIONS

This application is a continuation-in-part of my co-pending application Ser. No. 901,529 filed May 1, 1978, now abandoned, entitled "Protective Device for Automobiles".

BACKGROUND OF THE INVENTION

Cars left in a parking station or a parking lot are frequently banged by the door of the person adjacent to them in the lot thus marring the finish of the vehicle and detracting from its appearance and consequently the vehicle's value.

Heretofore, attempts have been made to place chrome or vinyl molding strips on each side of the vehicle to protect it. However, due to the very short distance between the outer edge of the molding strip and the surface to be protected, it is virtually impossible to prevent damage from doors with irregular shaped edges. As a consequence, some vehicle doors will engage the surface of the vehicle to be protected instead of the protective strip and damage the vehicle's body surface.

SUMMARY OF THE INVENTION

I have devised an automobile protection device adapted to protect the side of a vehicle from scratches and dents caused by the doors of adjacent vehicles.

The device comprises a flexible wire tape rigidly secured between a pair of horizontally extended rigid arms on each side of the vehicle which extend outwardly from the central portion of the side 6 to 10 inches. The tape may be attached to a reel device and dispensed outwardly from the end of a single arm to the second arm where it is hooked thereon. Thus the tape may be stored away within the reel. The arms are telescopicly disposed outwardly from each end of the vehicle such that they may be slideably disposed into the vehicle for storage when the vehicle is traveling on the road. When a car is placed in a parked position the arms are pulled outwardly from the side of the vehicle and the tape is stretched from one arm to the other arm. Screw means is provided to take up tension such that the tape is tauntly secured between the arms. Thus when an adjacent vehicle has a door open the tape or wire will deflect upwardly only a portion and deflect the door and not allow it to engage the surface of the vehicle or any protective molding. A tensile load causes a proportional bending moment in each horizontally extending arm which acts as a cantilever spring to absorb the tensile load thereby converting the kinetic energy of the moving door into potential energy of the cantilever spring thus arresting the door prior to engagement with the body of the automobile.

The primary object of the invention is to provide a vehicle body protective device which may be activated when a vehicle is parked from its retracted position to deflect and absorb the force of the door opening from an adjacent vehicle when the vehicle is parked.

A further object of the invention is to provide an apparatus which would sound an alarm which would alert persons in the vicinity of the vehicle that the vehicle has been hit.

Other and further objects of the invention will become apparent upon studying the detailed description hereinafter following and the drawings annexed hereto.

BRIEF DESCRIPTION OF THE DRAWINGS

Drawings to the preferred embodiments are annexed hereto so that the invention may be better and more fully understood, in which:

FIG. 2 is an enlarged sectional plan view showing the rear portion of one-half of the body protector;

FIG. 3 is an enlarged sectional plan view showing the front body protector;

Numeral refererences are used to designate like parts throughout the various figures of the drawings.

DESCRIPTION OF A PREFERRED EMBODIMENT

Figure 1:
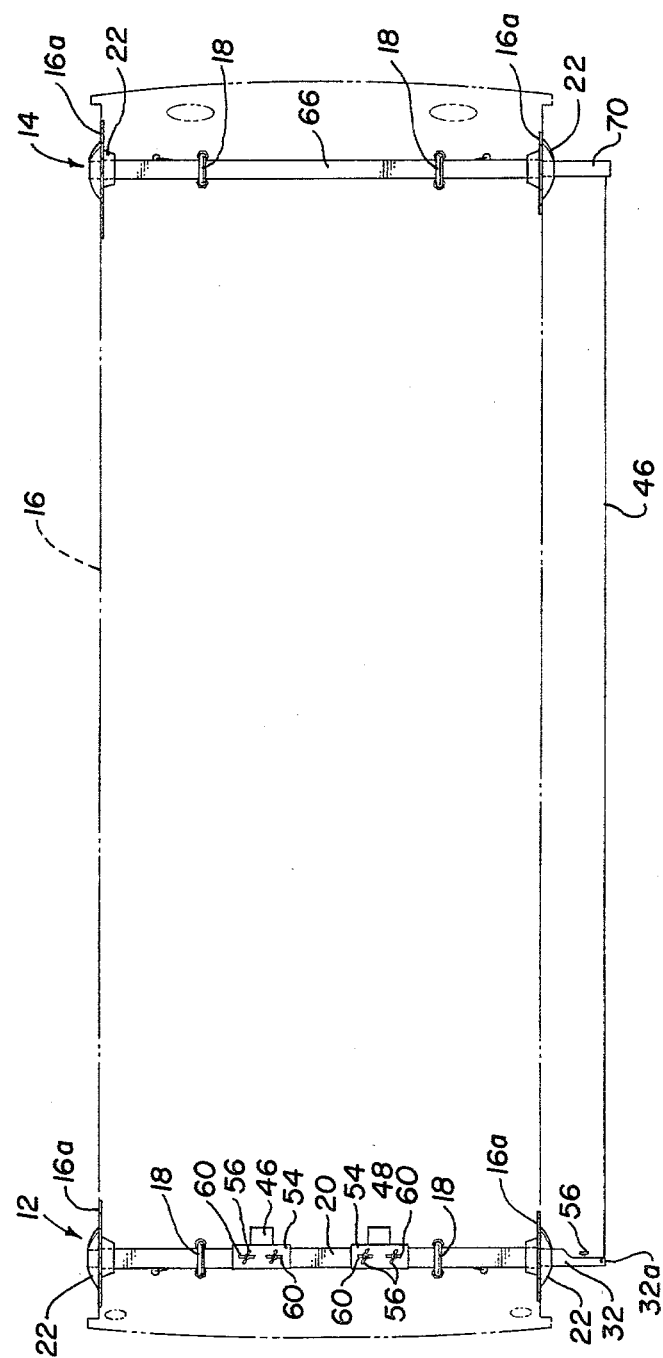
FIG. 1 is a diagrammatic plan view showing the body protector in place on a typical vehicle having one side deployed and one side retracted.
Figure 6:
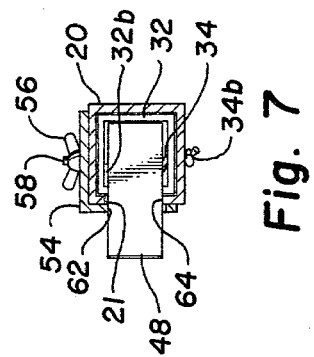
FIG. 6 is a cross-sectional view taken along line 6—6 of FIG. 2.

Referring to FIGS. 1–7 of the drawings and particularly FIG. 1, the body protector device generally comprises a rear portion designated 12 and a front portion designated 14. The rear portion 12 is generally disposed in the rear portion of the car preferrably in the trunk as illustrated in FIG. 1 illustrating a car 16 shown in dashed outline. The forward portion 14 is attached to the frame or the front of the radiator. U-bolts 18 may be used to attach the rear portion 12 and front portion 14 to the vehicle.

Referring to FIGS. 1 and 2, the rear portion of the device 12 generally comprises an outer tube 20 having a square cross-section which extends from one side of the vehicle 16 to the other. As illustrated in FIG. 2, the end of tube 20 is aligned with side 16a and is secured there by a rubber gasket 22. The gasket 22 fits in a round hole 24 and is secured there by shoulder 23. Finger grooves 26 are formed in the outer surface of gasket 22. An inner shoulder 28 is formed in the square opening 30 to limit outward movement of the sleeve 20 which is secured in the trunk by U-bolts 18.

On each side of the tube 20, an inner tube 32 or arm having a generally square cross-sectional area is telescopicly disposed within tube 20. Means such as strips of Teflon ® tape 21 is secured adjacent end 32b to provide a smooth bearing surface. Means to limit outward movement of tube 32 generally comprises a nylon rope 34 having a first end 34a secured to the end 32b of tube 32 and a second end 34b secured to an opening in tube 20. The end 32a of tube 32 is easily gripped by the hand by placing the fingers in grooves 26 on gasket 22 and pulling it out. A roller 36 is resiliently urged through an opening 38 in tube 20 by spring 40 into a detent 42 to limit movement of sleeve 32 when it is placed in an outward position. A second detent 44 engages roller 36 to retain the sleeve 32 in the retracted position wherein end 32a is flush with the outer surface of gasket 22.

Means to deflect a door or other object which may mar the finish on the side wall 16a of the vehicle generally comprises an elongated flexible steel tape 46 which is retained in case 48. Case 48 preferably has a spring such that excess length of tape 46 is reeled up for storage within case 48. The tape is positioned over a roller 50 rotatably secured on a shaft 52 at end 32a of tube 32. Roller 50 has a convex surface to match the curved concave surface of tape 46. A thumb screw 54 is threadedly secured through a cross-bar 56 to lock the tape 46 in position. The end of tape 46 has a rectangular bale 47 secured thereto by clevis 47a. When the tube 32 is stored in the retracted position bale 47 is hooked on deflected hook 33 and is in a shortened position as shown in dashed outline 46'. This allows the arm to be slid into the outer sleeve 20.

Figure 7:
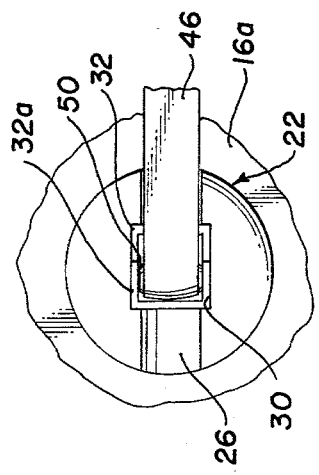
FIG. 7 is a cross-sectional view taken along line 7—7 of FIG. 2.
Figure 4:
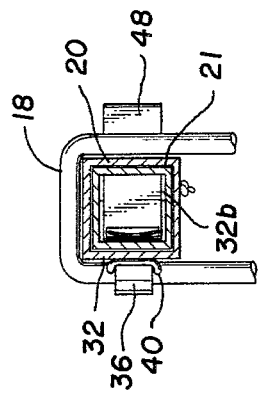
FIG. 4 is an elevational view taken along line 4—4 of FIG. 2.
Figure 5:
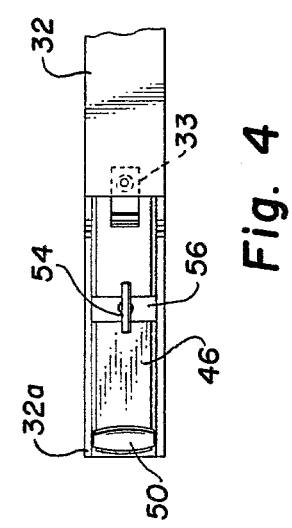
FIG. 5 is an elevational view taken along line 5—5 of FIG. 2.

Means to secure the case 48 in position generally comprises an L-shaped angle 54 secured by nuts 56 on studs 58. A slot is formed in angle 54 to receive case 48. A slot 21 is formed in the outer sleeve 20 having a length substantially longer than case 48 to allow for adjustment. Elongated holes 60 as illustrated in FIG. 1 allow adjustment of angle 54 lengthwise of outer sleeve 20 for adjustment of the length of tape 46. As illustrated in FIG. 7, a shoulder 62 is formed on the slot in angle 54 adapted to urge the upper surface of case 48 down in engagement with shoulder 64 on slot 21 to frictionally hold case 48.

The forward portion 14 generally comprises an outer rectangular-shaped tube 66 having an inner bore 68 which extends from side to side of vehicle 16 in the forward portion of the vehicle and is clamped down by U-bolts 18 in a similar fashion to the rear portion 12. A like gasket 22 is secured on each side of the vehicle and inner sleeve 70 telescopically disposed within the bore 68 of outer sleeve 66. Detents 72 and 74 engage roller 76 which is spring urged by bale 78 through hole 80 in outer sleeve 66 to hold the inner sleeve 70 in a retracted or extended position respectively. A hook 73 is formed on end 70a adapted to receive bale 47 of tape 46 when it is in an extended position. End 70b has a hole adapted to receive end 82a of a nylon rope 82 which has end 82b anchored in outer sleeve 66 to limit outward movement of inner sleeve 70.

As illustrated in FIG. 1, inner sleeves 32 and 70 are pulled outwardly until detents 42 and 74 respectively are engaged by rollers 36 and 76. This places the sleeves or arms in the extended position. The tape is removed from hook 33 on tube 32 and is pulled out of case 46 over roller 50 toward tube 70. The bale 47 is hooked on end 73 of sleeve 70. Tension is pulled back on tape 46 and thumb screw 56 is tightened to retain the tension. The tape 46 in reel 48 may be of the type such as a modified hardened steel measuring tape such as the type manufactured by Lufkin.

It should be noted that the other side illustrated in FIG. 1 is shown in a retracted position wherein sleeves 32 and 70 are fully retracted and even with gaskets 22.

It should be appreciated that gaskets 22 may be eliminated and that the arm may be extended through a portion of the body already existing such as the side turn indicator light, etc. The devices may be mounted in various positions on various vehicles; however, it should be mounted as close to the end as possible so that it protects the maximum amount of surface area.

When the tape 46 is stretched between sleeve 32 and sleeve 70 and retained in a tight position by thumb screw 56 it forms a barrier 6 to 10 inches from the surface of the vehicle 16. If an adjacent car door were to engage the tape 46 it would be deflected and the energy within the door would be slowed such that the door would most probably not engage the surface of vehicle 16 and if so would be slowed to the point where it would not mar the finish of the vehicle.

It should be appreciated that the tape would deflect slightly inwardly, causing additional tension on the arms. A tensile load causes a proportional bending moment in each horizontally extending arm which acts as a cantilever spring to absorb said tensile load, thereby converting the kinetic energy of the moving door of the vehicle adjacent thereto into potential energy of the cantilever spring, thus arresting the door's motion. Therefore, the tape in bale 47 should be capable of withstanding relatively high tensile load since the inward force of the door will be loading the tape longitudinally and pulling on the ends.

Figure 8:
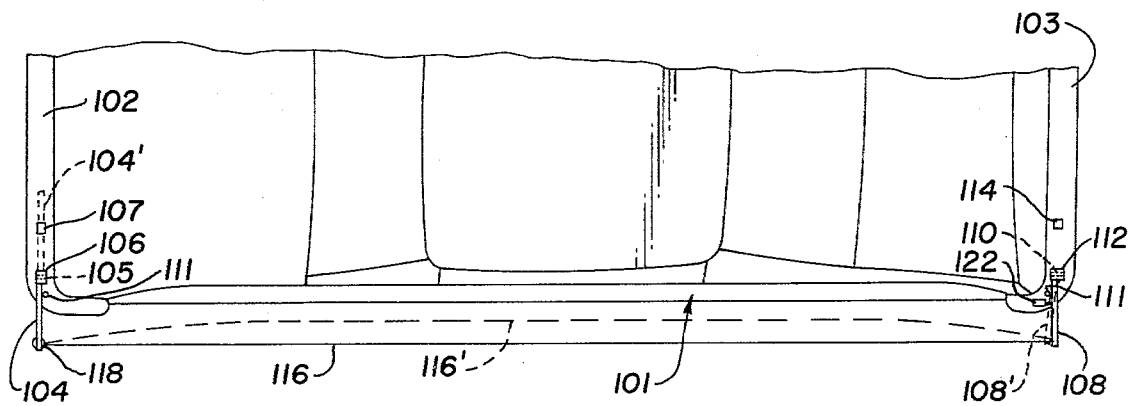
FIG. 8 is a diagrammatic plan view of a second embodiment showing the alarm apparatus attached to the vehicle's front and rear bumpers.
Figure 9:
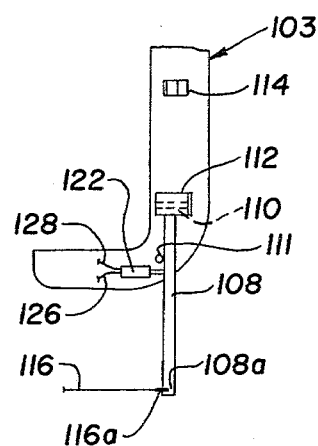
FIG. 9 is an enlarged plan view of the extension arm with parts broken away to more clearly illustrate the details of the construction.
Figure 10:
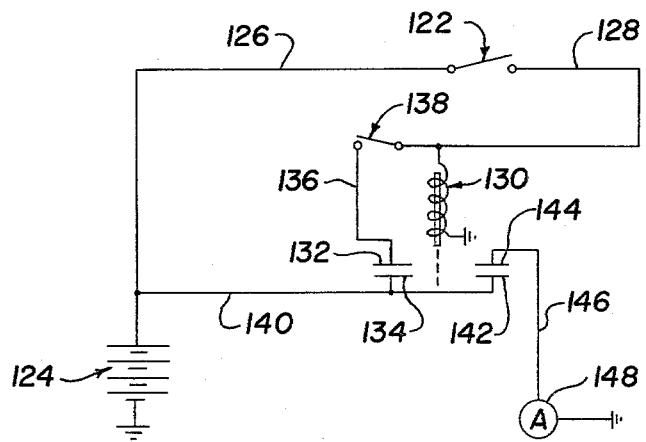
FIG. 10 is a diagrammatic view of the electrical hook-up apparatus.

A modified embodiment of the vehicle protector is illustrated in FIGS. 8-10 which incorporates an alarm system along with the deflection tape.

Referring to FIG. 8, one-half of a typical vehicle 101 is illustrated and has a front bumper 102 and rear bumper 103.

The modified embodiment generally comprises a rigid arm 104 secured to each side of bumper 102 and extending outwardly approximately 6 inches from the vehicle bumper. Arm 104 is pivotally secured by pin 105 to pivot block 106 secured to bumper 102 such that arm 104 may be folded away or below bumper 102 to the position 104' shown in dashed outline and detachably secured thereby retainer member 107.

Rear bumper 103 has a similar arm 108 pivotally secured by pin 110 to retainer block 112 secured to bumper 103 which may be pivoted over or under bumper 103 and detachably secured to retainer member 114. Movement of arms 104 and 108 inwardly toward each other is limited by pins 111 extending out of each bumpers 102 and 103.

Actuated means comprising a flexible wire member 116 such as a wire or tape or other elastic member is positioned horizontally between the two arms 104 and 108 on each side of the vehicle approximately 6 inches from the outer surface of the vehicle. Wire member 116 is preferably contained in a reel retainer device 118 secured to the outer end of arm 104. End 116a having a hood 120 formed thereon may be pulled from the reel 118 and secured in aperture 108a in the end of arm 108. Reel 118 is preferably of a locking type such that the length between arm 104 and arm 108 may be set such that any movement inwardly of the retainer member 116 will pull arm 108 inwardly toward the vehicle. Reel 118 may also be of an enertia locking device such that wire member 116 may be pulled out and attached to arm 108 and as the slack is pulled back in the reel 118, the wire 116 is locked in a predetermined length, thus allowing attachment to vehicles of varying length.

The edge of arms 108 engage an actuator means such as spring urged plunger switch 122 secured to bumper 103 such that any inward movement of arm 108 would close the contacts of switch 122 prior to engaging pin 111.

As illustrated in FIG. 10, a power source such as bettery 124 has a negative side secured to ground and the positive end secured to conductor 126 which is secured to one side of actuator switch 122. The other side of switch 122 is secured to conductor 128 which is secured to key operated switch 138 and conductor 136 to one side of relay coil 130 and contact 132 of relay contact. Contact 132 is adapted to engage contact 134 which is secured to conductor 140 which is secured to the position side of battery 124. The second set of contacts 142 and 144 are secured to conductor 146 which is secured to an alarm device such as a bell, horn, beacon, siren or other alarm type device 148, the other side of which is connected to ground. The system is designed such that it uses the normal power source of the vehicle, a wet storage type battery of a separate source of power.

Should an object such as a door strike one of the activation wire members 116 and move it to a position 116' shown in dashed outline in FIG. 8, arm 108 will be deflected to the position 108' shown in dashed outline, energizing actuator switch 122 to complete a circuit from conductor 126 to conductor 128. This will provide power to relay coil 130, closing contacts 132 and 134 and connecting a power source to relay 130 to maintain contacts 142 and 144 closed. As relays 142 and 144 are closed, power from battery 124 is connected to conductor 146 to energize the alarm device 148.

Because of the feedback contacts 132 and 134 providing power to the relay 130 the alarm will remain energized until deactivated by opening key switch 138. A time delay may be provided such that the circuit will only be energized for a short period of time such as 5 to 10 seconds or may be intermittently energized until the owner has returned. Further, the feedback contacts 132 and 134 may be left open by opening switch 138 such that once the wire member 116 has returned to its original position the alarm device 148 will be de-energized.

Further, wire 116 will become taunt when arm 108 engages pin 111 thus absorbing a portion of the kinetic energy from the door and deflecting the door from engaging the surface of the vehicle 101.

It should be readily apparent that the hereinbefore described device accomplishes the objects of the invention hereinbefore discussed.

It should be appreciated that other and further embodiments of the invention may be devised without departing from the basic concept herein discussed.

Having described my invention, I claim:

1. A vehicle body protection device comprising: a first pair of arms extending outwardly from the rear side portions of the vehicle and slideably disposed through the side of the body of the vehicle such that the arms are moveable from a first position extended from the side of said vehicle to a position retracted within said vehicle; a second pair of arms extending outwardly from the forward portion of the vehicle, said arms slideably disposed within the side of the vehicle such that the second pair of arms are moveable from a first position extended outwardly from the side of said vehicle to a position wherein they are retracted within the wall of said vehicle; a roller disposed on the end of each of said first pair of arms; a flexible band secured within a storage case such that the band may be retracted and stored within said case, said band being positioned over said rollers on said first pair of arms and adapted to be pulled from said first pair of arms to said second pair of arms and secured thereto such that the band extends along the side of the body of the vehicle; and means to prevent said band from becoming slack between said two arms such that an object striking said band is slowed or deflected away from the vehicle body.

2. The combination according to claim 1, including: a first outer tubular member disposed between the sides of the vehicle and adapted to slideably receive said first pair of arms; a second outer tubular member disposed between the sides of the vehicle and adapted to slideably receive said second pair of arms; and means securing said first and second outer tubular members to said vehicle.

3. The combination according to claim 2, including: means to limit outward movement of each arm relative to the side of the vehicle; and means to limit inward movement of each arm when said arms are extended.

4. The combination according to claim 1 wherein said means to prevent said band from becoming slack comprises: a screw adapted to urge said band into frictional contact with each of said pair of arms.

5. The combination according to claim 2, including: means to limit outward movement of each of said arms when in the retracted position.

* * * * *